(12) United States Patent
Ormesher et al.

(10) Patent No.: US 7,653,155 B1
(45) Date of Patent: Jan. 26, 2010

(54) USING CONVOLUTIONAL DECODING TO IMPROVE TIME DELAY AND PHASE ESTIMATION IN DIGITAL COMMUNICATIONS

(75) Inventors: Richard C. Ormesher, Albuquerque, NM (US); John J. Mason, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 709 days.

(21) Appl. No.: 10/982,134

(22) Filed: Nov. 4, 2004

(51) Int. Cl.
*H04L 27/06* (2006.01)
*H04B 1/707* (2006.01)

(52) U.S. Cl. ...................... 375/341; 375/150

(58) Field of Classification Search ............... 375/141, 375/147, 148, 242, 260–262, 265, 340, 341, 375/142, 144, 150, 152, 343; 714/794, 795, 714/800
See application file for complete search history.

(56) References Cited

U.S. PATENT DOCUMENTS

2004/0205383 A1* 10/2004 Sawaguchi .................. 714/6
2004/0208236 A1* 10/2004 Fenton ........................ 375/148
2005/0058224 A1* 3/2005 Alagha et al. ............... 375/316
2005/0086570 A1* 4/2005 Ariyoshi ..................... 714/755
2005/0102600 A1* 5/2005 Anandakumar ............. 714/755
2005/0278603 A1* 12/2005 Berens et al. ............... 714/755

OTHER PUBLICATIONS

P. Y. Kam and H.C. Ho, "Viterbi Detection with Simultaneous Suboptimal Maximum Likelihood Carrier Phase Estimation," IEEE Transactions on Communications, vol. 36, No. 12 pp. 1327-1330, Dec. 1988.
Macchi, O., "A dynamic Programing Algorithm for Phase Estimation and Data Decoding on Random Phase Channels", IEEE Trans Infrom. Theory, vol. IT-27, No. 5, pp. 581-595, Sep. 1981.
Proakis, J.G., "Digital Communications", 3rd Ed., 1995, McGraw Hill, Boston Mass., Sect. 6-2-2, "Phase Locked Loops", pp. 341-343 and, Sect. 6-2-4, "Decision Directed Loops", pp. 347-350.
Hanza, L., et al., "Turbo Coding, Turbo Equalisation and Space-Time Coding for Transmission Over Fading Channels, IEEE Press, 2002, Sect. 5.3.6," The soft-Output Viterbi Algorithm, pp. 133-137.

* cited by examiner

*Primary Examiner*—Young T. Tse
(74) *Attorney, Agent, or Firm*—Scott B. Stahl (57) ABSTRACT

The time delay and/or phase of a communication signal received by a digital communication receiver can be estimated based on a convolutional decoding operation that the communication receiver performs on the received communication signal. If the original transmitted communication signal has been spread according to a spreading operation, a corresponding despreading operation can be integrated into the convolutional decoding operation.

24 Claims, 11 Drawing Sheets

Multiplexer output:

rate 1/2: $m_i(k) = \{m_1(k), m_2(k)\} = u(1), p(1), u(2), q(2), u(3), p(3), u(4), q(4)...$ rate 1/3: $m_i(k) = \{m_1(k), m_2(k), m_3(k)\} = u(1), p(1), q(1), u(2), p(2), q(2), u(3), p(3), q(3)...$

$$\gamma(s_{k-1}, s_k) = \hat{m}_1 \times \sum_{n=2kN_c}^{n=2kN_c+N_c-1} y(t_n) y_{ref}(t_n + \hat{\tau}_{s_{k-1}}) e^{-j\hat{\varphi}_{s_{k-1}}}$$

$$+ \hat{m}_2 \times \sum_{n=2kN_c+N_c}^{n=2kN_c+2N_c-1} y(t_n) y_{ref}(t_n + \hat{\tau}_{s_{k-1}}) e^{-j\hat{\varphi}_{s_{k-1}}}$$

Eqn. (13)

$$v_E(k,s_k) = \sum_{n=2kN_c}^{n=2kN_c+N_c-1} \hat{m}_1(k,s_k)y(t_n)e^{-j\hat{\varphi}_{s_k}} y_{ref}(t_n+\hat{\tau}_{s_k}+\delta)$$

$$+ \sum_{n=2kN_c+N_c}^{n=2kN_c+2N_c-1} \hat{m}_2(k,s_k)y(t_n)e^{-j\hat{\varphi}_{s_k}} y_{ref}(t_n+\hat{\tau}_{s_k}+\delta)$$

$$+ v_E(k,s_{k-1})$$

← Eqn. (8)

FIGURE 7

$$v_M(k,s_k) = \sum_{n=2kN_c}^{n=2kN_c+N_c-1} \hat{m}_1(k,s_k)y(t_n)e^{-j\hat{\varphi}_{s_k}} y_{ref}(t_n+\hat{\tau}_{s_k})$$

$$+ \sum_{n=2kN_c+N_c}^{n=2kN_c+2N_c-1} \hat{m}_2(k,s_k)y(t_n)e^{-j\hat{\varphi}_{s_k}} y_{ref}(t_n+\hat{\tau}_{s_k}) + v_M(k,s_{k-1})$$

← Eqn. (9)

FIGURE 8

$$v_L(k, s_k) = \sum_{n=2kN_c}^{n=2kN_c+N_c-1} \hat{m}_1(k,s_k) y(t_n) e^{-j\hat{\varphi}_{s_k}} y_{ref}(t_n + \hat{\tau}_{s_k} - \delta)$$

$$+ \sum_{n=2kN_c+N_c}^{n=2kN_c+2N_c-1} \hat{m}_2(k,s_k) y(t_n) e^{-j\hat{\varphi}_{s_k}} y_{ref}(t_n + \hat{\tau}_{s_k} - \delta) + v_L(k, s_{k-1})$$

← Eqn. (10)

FIGURE 9

$$\delta\hat{\varphi}_{s_k} = \mathrm{atan}\left(\frac{\mathrm{imag}(v_M(k,s_k))}{\mathrm{real}(v_M(k,s_k))}\right)$$

← Eqn. (11)

USING CONVOLUTIONAL DECODING TO IMPROVE TIME DELAY AND PHASE ESTIMATION IN DIGITAL COMMUNICATIONS

This invention was developed under Contract DE-AC04-94AL8500 between Sandia Corporation and the U.S. Department of Energy. The U.S. Government has certain rights in this invention.

FIELD OF THE INVENTION

The invention relates generally to digital communication receivers and, more particularly, to digital communication receivers that perform convolutional decoding.

BACKGROUND OF THE INVENTION

The four documents listed below are incorporated herein by reference:
[1] Pooi Y. Kam and Hsi C. Ho, "Viterbi Detection with Simultaneous Suboptimal Maximum Likelihood Carrier Phase Estimation," IEEE Trans. Comm., Vol. 36, No. 12, pp. 1327-1330, December 1988.
[2] O. Macchi and L. Scharf, "A Dynamic Programming Algorithm for Phase Estimation and Data Decoding on Random Phase Channels," IEEE Trans. Inform. Theory, Vol. IT-27, No. 5, pp. 581-595, September 1981.
[3] Proakis, John G., Digital Communications, 3rd Ed., 1995, McGraw Hill, Boston, Mass.
[4] L. Hanza, T. H. Liew, and B. L. Yeap, Turbo Coding. Turbo Equalization and Space-Time Coding for Transmission over Fading Channels, IEEE Press, 2002.

Figure 1:
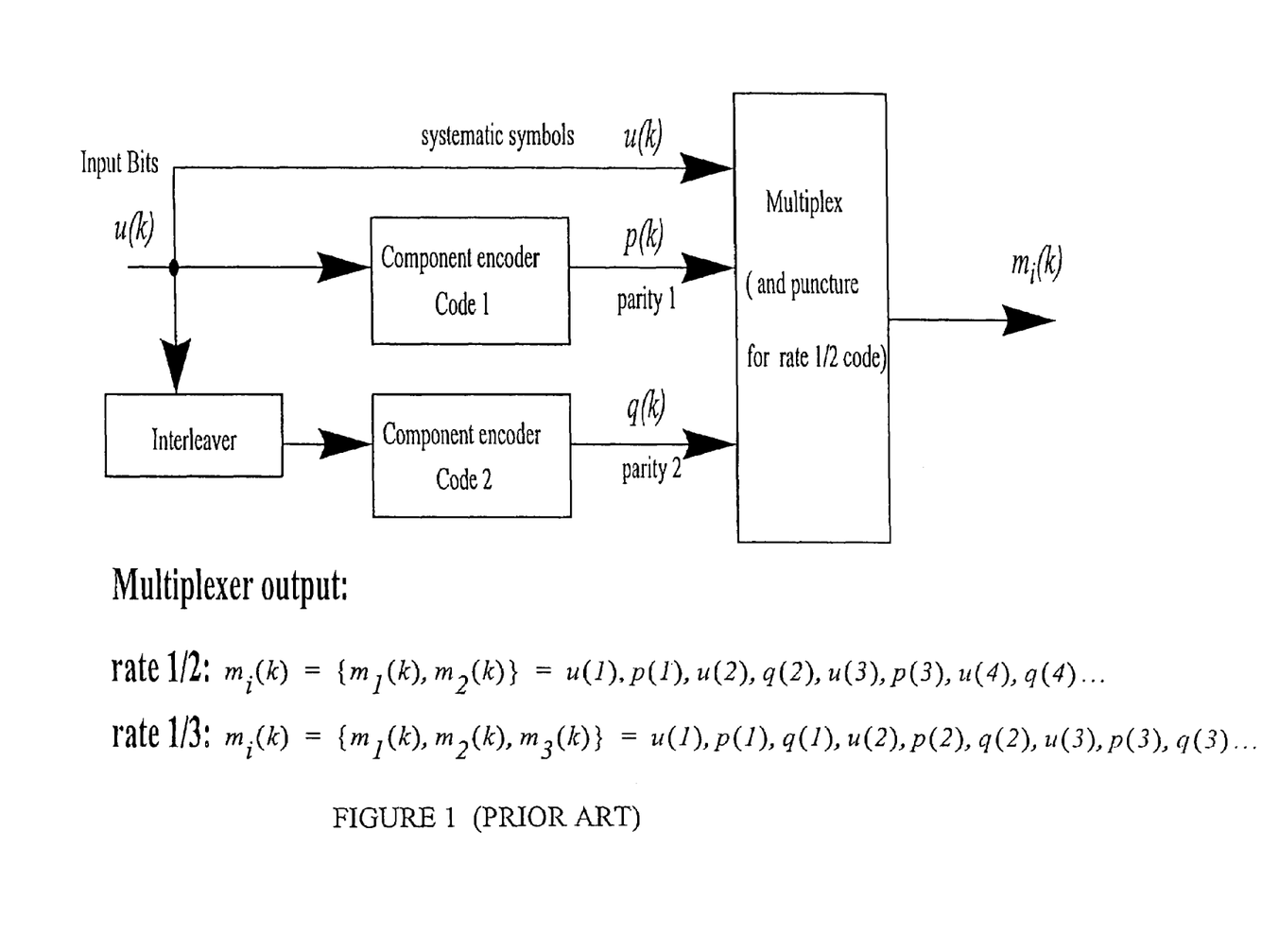
FIG. 1 diagrammatically illustrates a turbo channel encoder according to the prior art.

In conventional digital communications receivers, a received message might consist of a preamble or acquisition sequence followed by a block of coded channel symbols that have been spread with a direct sequence spread spectrum (DSSS) code. The acquisition preamble's SNR is typically large enough to provide an estimate of the initial carrier frequency, phase, and symbol timing. The received signal typically has both symbol timing and carrier frequency drift, due to clock errors and relative motion between the receiver and transmitter.

$$y(t_n) = \sqrt{\frac{E_s}{T_s}} c_i(k, t_n - \tau(t_n)) m_i(k) e^{j\varphi(t_n)} + n(t_n) \quad (1)$$

A sample at time $t_n$ of a DSSS binary phase-shift keyed (BPSK) communications signal transmitted over an additive white Gaussian noise channel has the following complex form where $E_s$ denotes the constant symbol energy, $c_i(k,t)$ is the bipolar spreading function of time t for the $k^{th}$ data bit, i is the symbol index for the $k^{th}$ data bit and consist of the values $\{1,2\}$ for a ½ rate code, or $\{1, 2, 3\}$ for a rate 1/3 code, for example. $T_s$ is the data symbol interval, $m_i(k)$ is the sequence of data symbols from the channel encoder output (see FIG. 1) and for BPSK modulation takes on values of $\pm 1$, $\tau(t)$ is an unknown time-varying time delay, $\phi(t)$ is an unknown time-varying carrier phase, n(t) is zero mean complex Gaussian noise with variance $\sigma_n^2 = N_0/T_{ad}$, and n is the time sample index. The received signal is sampled such that $$t_n - t_{n-1} = T_{ad} \quad (2)$$

where $T_{ad}$ is the analog-to-digital converter sample interval.

Coherent PSK communications require that the transmitter and receiver waveforms be synchronized. As mentioned above, the received signal (1) contains both an unknown timing term, $\tau(t)$, and phase term, $\phi(t)$. These unknown terms are due to transmitter and receiver clock errors and RF channel dynamics. The receiver, therefore, needs to estimate and remove these unknown time and phase terms prior to despreading and detecting the channel symbols.

Figure 2:
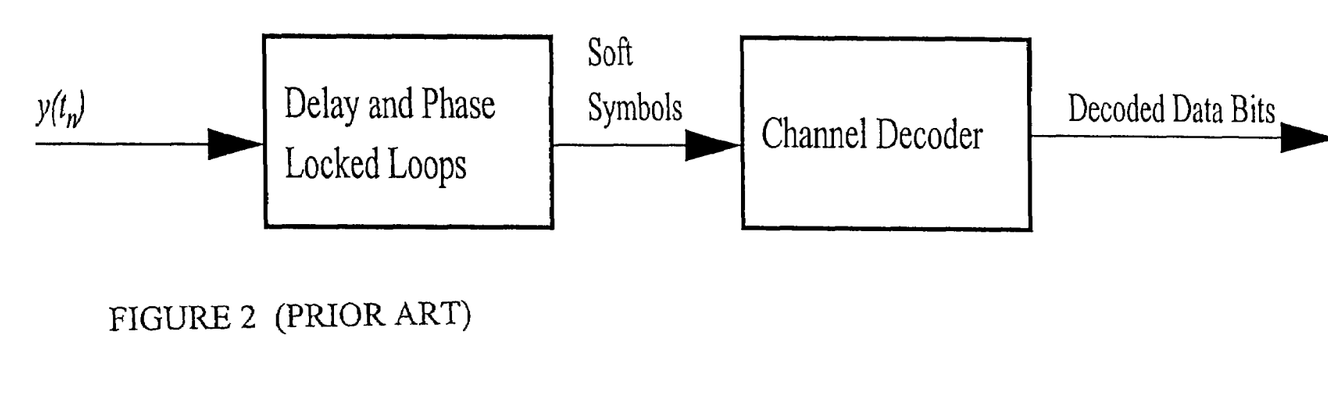
FIG. 2 diagrammatically illustrates delay lock loops and phase lock loops combined with channel decoders according to the prior art.

The conventional coherent demodulation approach, shown in FIG. 2, is to employ phase and delay locked loops (PDLL) to track and remove unknown phase and time terms prior to channel decoding.

Figure 3:
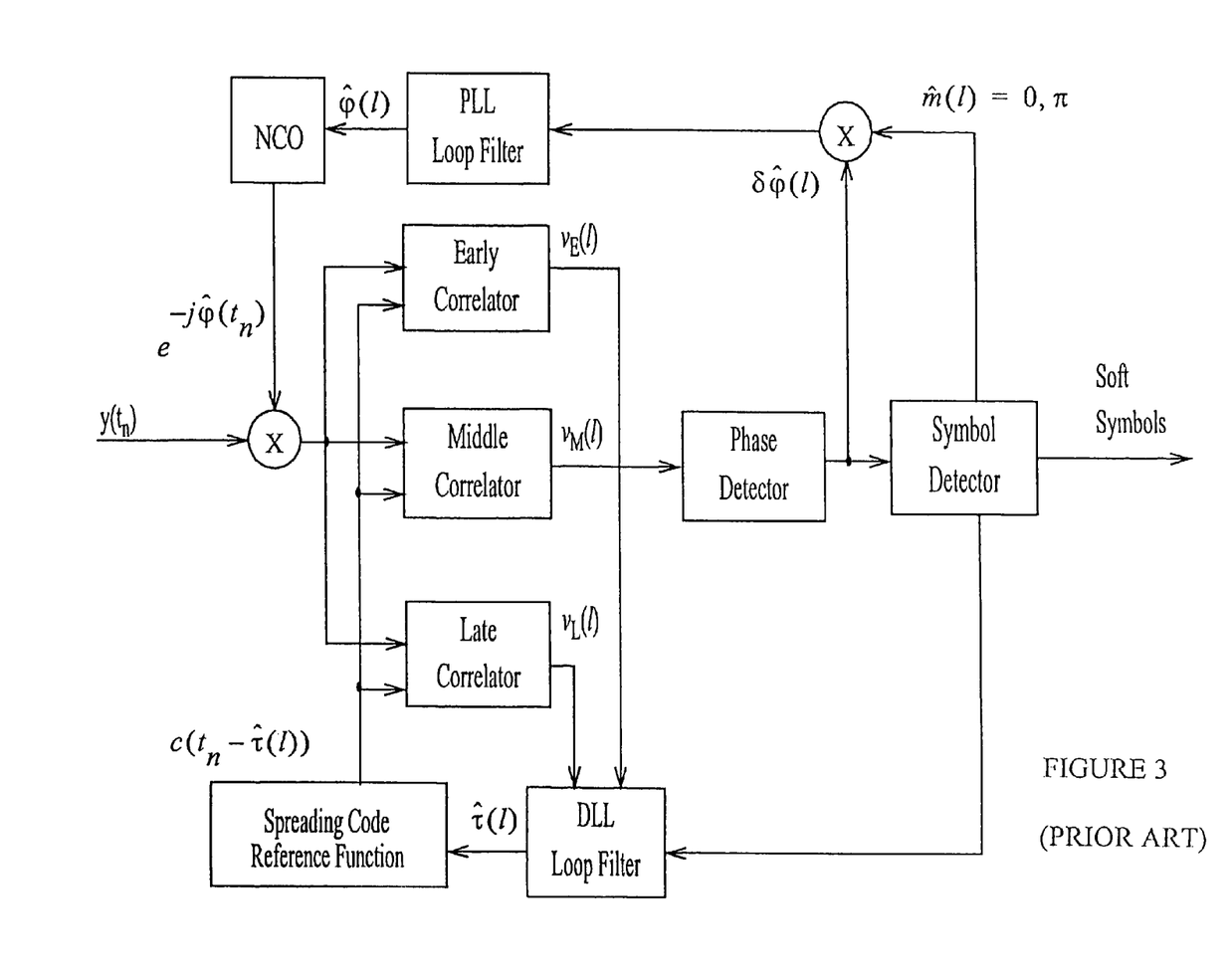
FIG. 3 diagrammatically illustrates delay and phase locked loops according to the prior art.

FIG. 3 is a block diagram for a conventional coherent data-aided Delay and Phase Locked Loop (DPLL). The input data stream, $y(t_n)$, is assumed to be a sampled complex signal defined by (1). The time tracking and phase tracking loops are implemented in parallel. The DLL consists of a pair of early and late correlators to track bit timing and despread the DSSS modulation. The data-aided PLL is implemented digitally with a Numerically Controlled Oscillator (NCO) and hard-symbol detector. The PLL performs the carrier phase tracking required to remove the unknown phase term, $\phi(t_n)$. The output of the middle correlator is the complex value of the despread symbol and the phase of this term is corrected by 0 or $\pi$ radians according to the sign of the detected soft symbol (i.e., a data-aided loop). The phase corrected middle correlator output is fed into the loop filters. In FIG. 3 the parameter l indicates the index of a data symbol. Dropping the subscript on $m_i(k)$ indicates the alternate indexing scheme such that $m(l)=m(k+i/R)$ for a rate R code. This symbol index illustrates how data symbols are processed in the conventional DPLL approach.

$$v_E(l) = \sum_{n=l \cdot N_c}^{n=l \cdot N_c + N_c - 1} y_{ref}(t_n + \hat{\tau}(t_n) + \delta T_c) y(t_n) e^{-j\hat{\varphi}(t_n)} \quad (3)$$

The equations for the correlators and phase detector of FIG. 3 are given as follows:

$$v_M(l) = \sum_{n=l \cdot N_c}^{n=l \cdot N_c + N_c - 1} y_{ref}(t_n + \hat{\tau}(t_n)) y(t_n) e^{-j\hat{\varphi}(t_n)} \quad (4)$$

$$v_L(l) = \sum_{n=l \cdot N_c}^{n=l \cdot N_c + N_c - 1} y_{ref}(t_n + \hat{\tau}(t_n) - \delta T_c) y(t_n) e^{-j\hat{\varphi}(t_n)} \quad (5)$$

$$\delta\hat{\varphi}(l) = a\tan 2\left(\frac{\text{imag }(v_M(l))}{\text{real }(v_M(l))}\right) \quad (6)$$

$$\delta\hat{\tau}(l) = f(v_E(l) - v_L(l)) \quad (7)$$

where $y(t_n)$ is the sampled input signal; $y_{ref}$ is the reference signal used to despread the input signal, $v_E$, $v_M$, and $v_L$ are the integrate and dump outputs of the early, middle and late correlators, respectively; $\delta\hat{\varphi}(l)$ is the instantaneous phase estimate of the input signal and is obtained from the output of the middle correlator, $v_M$, $\hat{\varphi}(l)$ is the filtered phase estimate, $\delta\hat{\tau}(l)$ is the instantaneous time delay estimate of the input signal and is obtained from the output of the early and late correlators, $v_E$ and $v_L$, and $\hat{\tau}(l)$ is the filtered time delay estimate.

The performance of conventional coherent data-aided DPLLs such as described above is degraded when the symbol energy to noise power density ratio $E_s/N_o$ is low.

It is therefore desirable to provide for delay and phase estimation in digital communications receivers regardless of whether $E_s/N_o$ is low.

Exemplary embodiments of the invention provide a time delay and/or phase estimate at low $E_s/N_o$ by making the estimate(s) based on a convolutional decoding operation performed on the received communications signal.

DETAILED DESCRIPTION

The present invention recognizes that Turbo codes can operate with very low symbol energy to noise power density ratios values ($E_s/N_0$<0 dB), and that DPLL performance will improve if the SNR at the correlator output is increased by removing the data modulation and coherently integrating over more than one symbol. The invention further recognizes that SNR can be increased by increasing the coherent integration time of the early, middle, and late correlators. However, the coherent integration interval cannot be increased without first removing the unknown data symbol modulation.

The invention provides a novel approach to solve this problem. This approach integrates the DPLL into a convolutional decoder algorithm (e.g., a Viterbi algorithm), and uses the estimated symbols from within the decoding process to remove a set of one or more unknown data symbols prior to the correlators (i.e., integrate and dump operation) used in the standard DPLL method.

This results in two improvements relative to the conventional DPLL approach. First, using the data symbol estimates from within the data decoder provides a better symbol estimator than the simple hard symbol detector used over a single data symbol as done in the conventional DPLL. By using the data symbol estimates from within the decoder, the information imparted on adjacent symbols by the channel encoder is exploited. This results in fewer phase modulation removal errors in the data-aided loop. Second, in the conventional DPLL only a single symbol is detected and removed at a time, which limits the coherent integration time to a single symbol. The present invention can estimate and integrate over several data symbols at a time as explained below. This increases the coherent integration time and results in an increase in the effective signal to noise ratio at the output of the DPLL correlators. The end result is improved estimates of the instantaneous phase and time delay terms, which allows the DPLL to work at lower $E_s/N_0$ values.

Exemplary embodiments of the invention can jointly track and decode convolutionally encoded error control channel symbols in a phase-shift keyed (PSK) digital communications receiver. Either or both symbol time and phase estimation can be incorporated within a Viterbi decoding process. This approach is referred to herein as the Integrated Viterbi Algorithm (IVA). Making data decisions inside the Viterbi decoding process improves the performance of the time and phase tracking loops, compared to prior art methods which make time and phase corrections prior to the Viterbi decoding process. Exemplary embodiments of the invention exploit the correlations among adjacent convolutionally-encoded symbols. Within the Viterbi decoder a PSK decision can be based not solely on the measured phase of the symbol in question, but also on the phases and decisions regarding all other symbols on the path selected during the Viterbi decoding process.

The IVA can be incorporated into a Turbo decoder resulting in a tracking Turbo decoder that can operate at lower signal-to-noise ratio (SNR) than that of a delay and phase locked loop (DLL/PLL) using the conventional approach. According to exemplary embodiments of the invention, an IVA decoder and a conventional soft-output Viterbi algorithm (SOVA) decoder are concatenated in parallel to implement an Integrated Turbo Algorithm (ITA). The IVA estimates timing and/or phase, performs the PSK symbol detection, including despreading in some embodiments, and generates soft PSK symbol values for input to the parallel-concatenated conventional SOVA decoder. Thus, a Viterbi decoder with integrated (internal) delay and/or phase locked loops is provided, and can be used to make a Turbo decoder with integrated delay and phase tracking loops.

Figure 13:
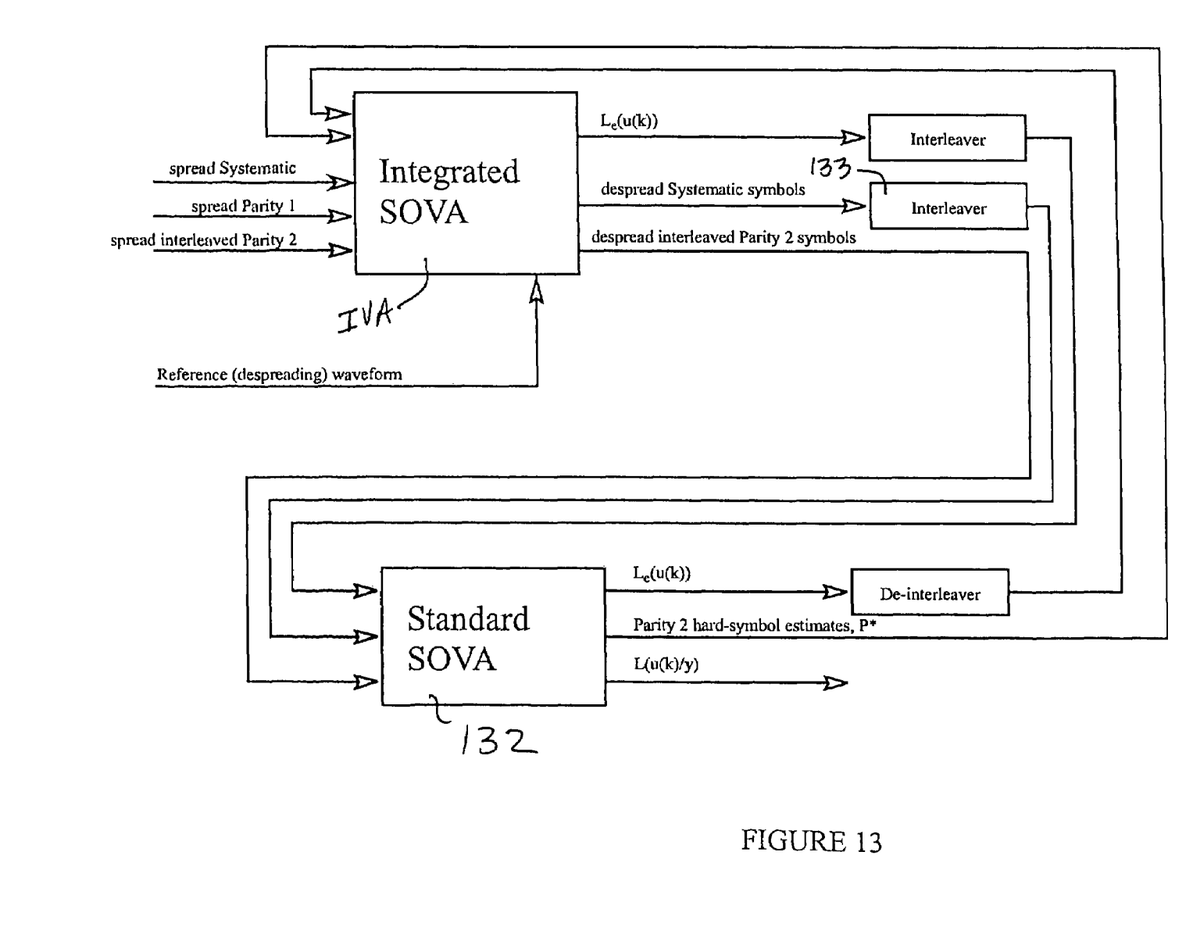
FIG. 13 diagrammatically illustrates pertinent portions of further exemplary embodiments of a digital communications receiver according to the invention.

A block diagram of exemplary embodiments of an ITA decoder that simultaneously despreads channel symbols, decodes channel symbols, and tracks timing and phase is shown in FIG. 13. Two component decoders are linked together by an interleaver, a de-interleaver, and the a priori information that is passed between them. The first component decoder of the ITA is the Integrated Viterbi Algorithm (IVA). In this IVA decoder, time and phase tracking are implemented simultaneously within a Soft Output Viterbi Algorithm (SOVA) decoding process. The input into the IVA is the sampled complex received signal as defined in Eqn. (1). In this example, the input signal has had a spreading sequence applied thereto, and has unknown, time-varying phase and time-delay parameters. FIG. 13 shows the input signal partitioned into systematic and parity symbols. The operations required to despread the symbols and estimate and remove the unknown time and/or phase terms are implemented as an integral operation within the IVA decoder.

Some embodiments use a data-aided coherent Delay and Phase Lock Loop (DPLL) that is executed simultaneously during the Viterbi decoding process of the IVA decoder. Phase and time estimation can be performed with respect to the input signal, for example, a spread spectrum BPSK signal. The output of the IVA decoder is a set of despread soft symbols and the normal extrinsic information, $L_e(u_k)$, related to the information bit u(k) (see also FIG. 1). The despread soft symbols correspond to the set of soft symbols that would typically come from the output of a conventional DPLL preceding the channel decoder (see also FIGS. 2 and 3).

Because of the interleaving (see also FIG. 1), phase estimation, time estimation, and data despreading can only be implemented within the IVA decoder. This is because the systematic symbols that are input to the second component decoder 132 must be interleaved at 133 to account for the fact that the systematic symbols were interleaved before encoding and transmission of the Parity 2 information, as shown in FIG. 1. The interleaving at 133 scrambles the phase on the systematic symbols, making tracking impossible in decoder 132. The output from the decoder 132 includes the extrinsic information, $L_e(u_k)$, related to the information bit, u(k), the a posteriori Log-Likelihood Ratio (LLR) for the information bit, L(u(k)|y), and the hard-symbols estimates for the Parity 2 symbols. The hard detected Parity 2 symbols are used in the DPLL of the IVA decoder, as described in more detail below.

Figure 4:
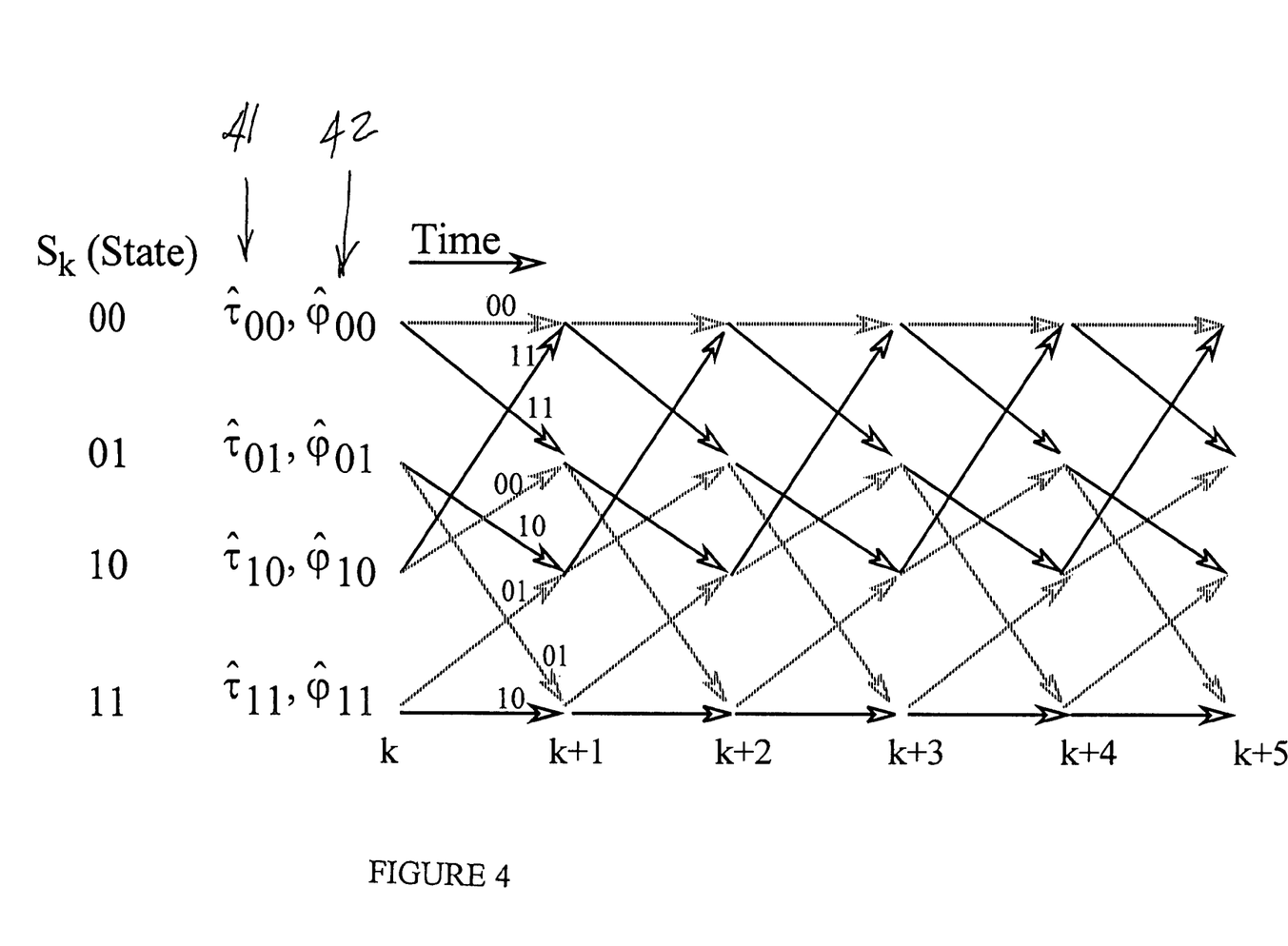
FIG. 4 is a trellis diagram for a ½ rate RSC code of constraint length three.

Exemplary embodiments of the IVA decoder according to the invention integrate a DLL and/or a PLL into the Viterbi Algorithm. The conventional Viterbi algorithm searches all possible paths in its associated trellis, and selects the codeword (i.e., encoder output) whose distance from the received symbol sequence is smallest among all possible codewords. The decoding algorithm starts at the first received symbol and continues until the last received symbol is processed. At each bit interval, the path is reduced by deselecting codewords from all the possible remaining codewords. At each interval for each state of the trellis, two paths merge into that single state, as shown in FIG. 4. The path with the smaller metric is eliminated as the optimal path, leaving a single surviving path for that state at that interval. When the end of the trellis is reached, there are four surviving paths, and the surviving path with the largest path metric is selected as the most likely path. At any bit interval within the decoding process there are $2^{K-1}$ possible surviving paths, where K is the constraint length of the encoder (K=3 in FIG. 4). Each of these paths has a unique associated codeword. These codewords are used to implement a data-aided loop according to the invention. In some embodiments, a separate DPLL is implemented for each of these paths during the decoding process.

Consider the correlators defined by Eqn. (3) through Eqn. (5) above that are used to estimate instantaneous time delay, $\delta\hat{\tau}(l)$, and instantaneous phase, $\delta\hat{\phi}(l)$, of the $l^{th}$ symbol, m(l) within the conventional data-aided DPLL. The correlator signal outputs $v_E(l)$ and $v_L(l)$ are used in the delay computer to track and time align the input signal to a reference signal, while correlator output $v_M(l)$ is used to estimate the phase of the current symbol. In each case, the correlators use the detected hard-symbol $\hat{m}(l)$ to remove the data modulation before the symbol phase and time estimate are made (i.e., a data-aided loop). In the loop shown in FIG. 3, the hard-symbol detection occurs after the basic integrate and dump operation from the middle correlator.

As previously mentioned, according to exemplary embodiments of the invention, the effective SNR at the output of the correlators can be increased and the instantaneous estimates of both symbol time and phase can be improved, thereby improving the overall performance of the DPLL. From examination of Eqn. (3) through Eqn. (5), if the symbol values, $\hat{m}(l)$ are known a priori, and if time and phase are constant over several symbols, then the correlators can integrate over several symbols before estimating time and phase. Define L as the number of bit intervals in which time and phase are considered constant enough to allow for coherent integration. Examples of L in various embodiments are 5, 10, 50, 100, etc. Then, for a ½ rate component code, at any bit interval in the Viterbi decoding process, there are a set of 2*L symbol estimates for each surviving path. These symbols can be used to remove data symbol modulation and increase the correlator integration interval in a data-aided DPLL. One of the surviving paths will eventually be selected as the most likely path.

Figure 7:
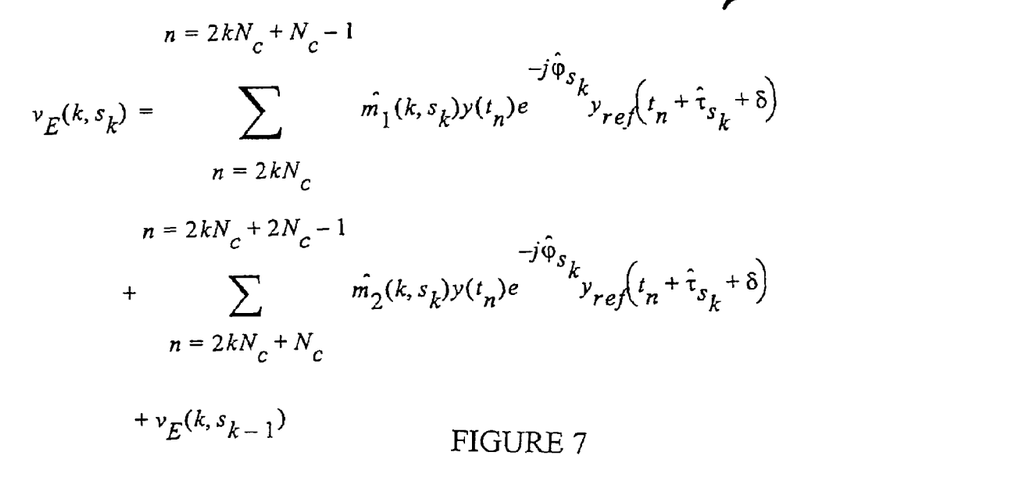
FIG. 7 illustrates operations which can be performed by exemplary embodiments of an early correlator according to the invention.
Figure 8:
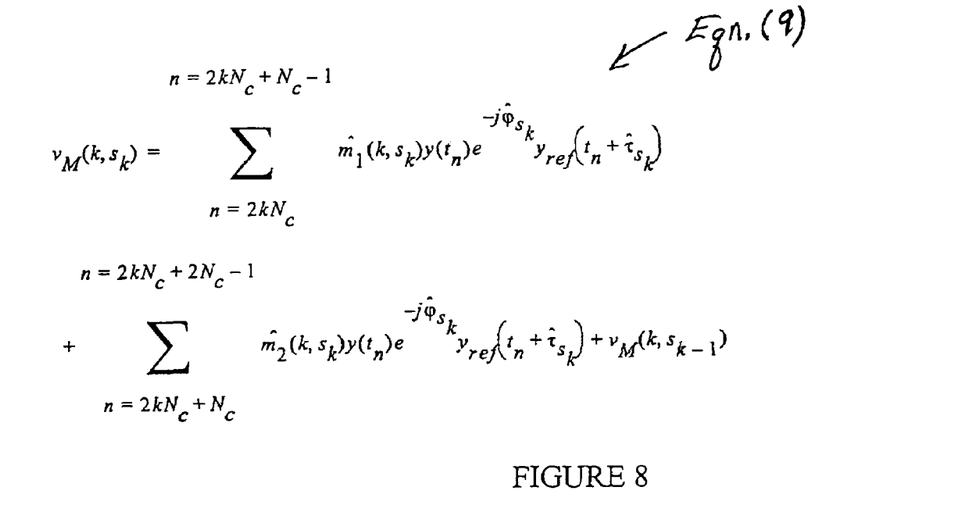
FIG. 8 illustrates operations which can be performed by exemplary embodiments of a middle correlator according to the invention.
Figure 9:
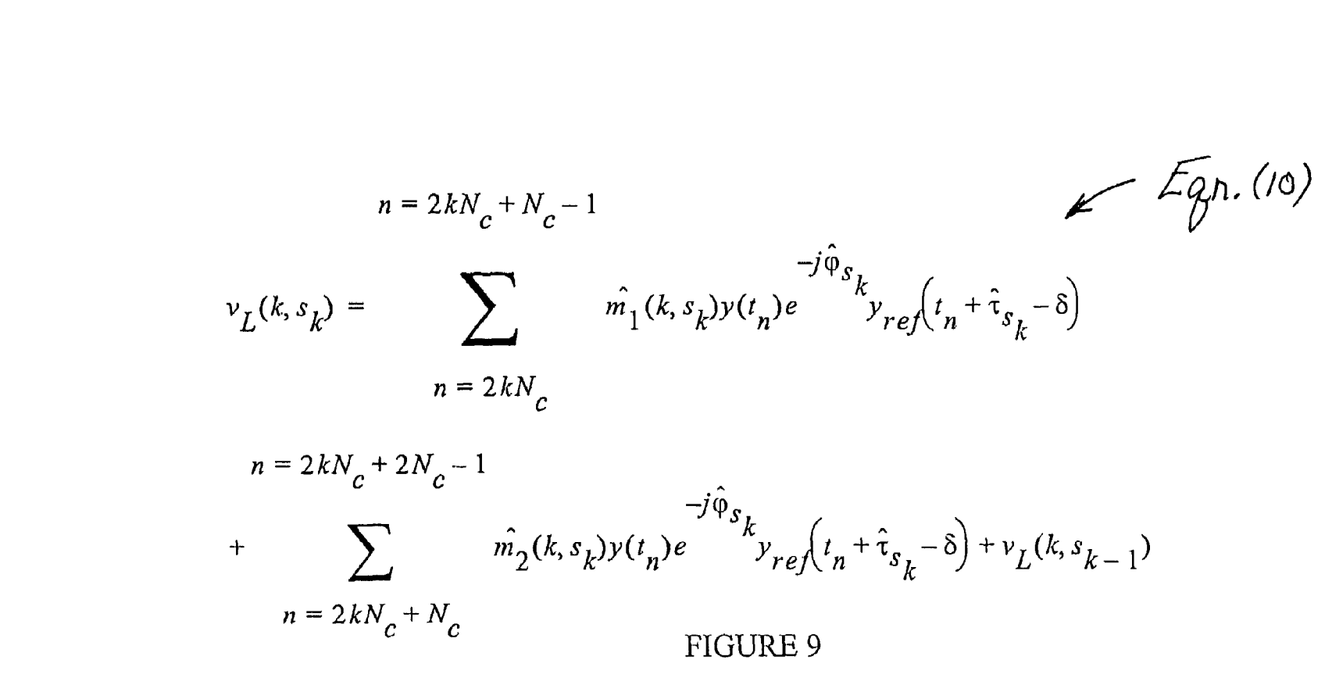
FIG. 9 illustrates operations which can be performed by exemplary embodiments of a late correlator according to the invention.

Eqn. (8), Eqn. (9) and Eqn. (10) shown respectively in FIGS. 7, 8 and 9 define examples of early (FIG. 7), middle (FIG. 8) and late (FIG. 9) correlators that support coherent integration over a block of L Viterbi decisions for a ½ rate punctured code according to exemplary embodiments of the invention.

Figure 10:
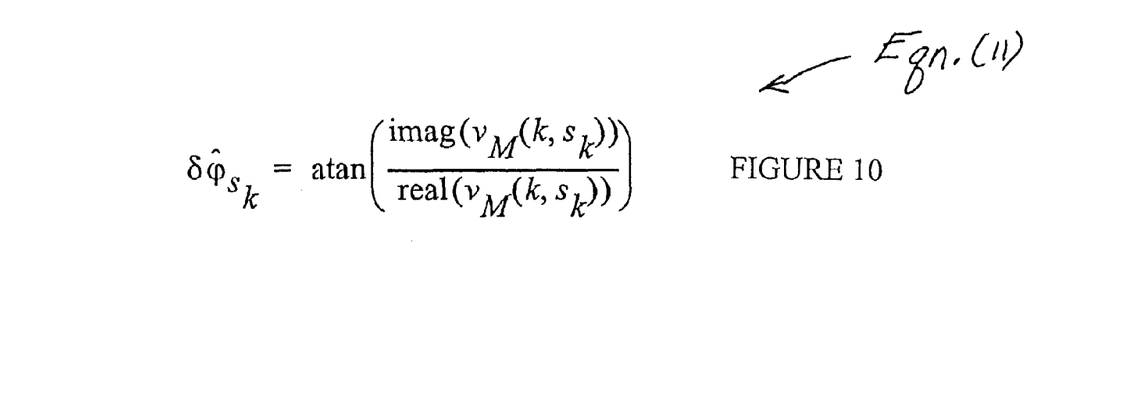
FIG. 10 illustrates operations which can be performed by exemplary embodiments of a phase processor according to the invention.

In Eqn. (8) to Eqn. (10) $s_k$ indicates the current state at the $k^{th}$ bit interval in the Viterbi decoding process, $s_{k-1}$ indicates the previous state for the selected path and $N_c$ is the number of PN code chips per data symbol. In some embodiments, $\delta$ is $\frac{1}{8}^{th}$ of a chip width. In the ½ rate decoder $\hat{m}_i(k, s_k)$ is the symbol estimate at the $k^{th}$ bit for state $s_k$ while i=1 for the systematic symbol and i=2 for the parity symbol. Notice, that for a ½ rate encoder the correlators sum over two data symbols per decoding interval and will sum over a total of 2*L data symbols before they are dumped and phase and time estimates are updated. Also, notice that there is a unique DPLL implemented for each surviving path of the trellis. Eqn. (11) of FIG. 10 needs to use a two argument arctangent function whose range is $-\pi$ to $\pi$.

To illustrate the use of Eqn. (8) to Eqn. (10), assume that we are at the kth bit interval in the Integrated Viterbi Algorithm. Then, at each state, $s_k$, there is a surviving path (see also FIG. 4) and an associated Viterbi path metric. In addition, each surviving path has a time delay and phase estimate, $\hat{\tau}_{s_k}$, and $\hat{\phi}_{s_k}$, respectively. These are the time and phase terms that are estimated and tracked via the DPLL and are updated for each state every L bit intervals according to the invention. Each state therefore has associated therewith one or both of a phase estimate and a time delay estimate, and the estimates for each state are completed at the completion of each block of L bit intervals. At the beginning of the trellis processing, some embodiments use conventional techniques to make an initial time delay estimate for all states (see FIG. 4) based on the message preamble. The initial phase estimates at the beginning of the trellis can be handled in similar fashion, estimating the phase for all states based on the preamble. The initial time delay and phase estimates for the various states are shown at 41 and 42 in FIG. 4.

For the correlators, the next 2*L data symbols are summed using the decision sequence $\hat{m}_i(k, s_k), \ldots, \hat{m}_i(k+L, s_{k+L})$ to remove the data modulation. Because we are in the middle of the Viterbi decoding process, there is a decision sequence from $s_k$ to $S_{k+L}$ for each survivor of state $S_{k+L}$ at the k+L bit.

The terms $v_E$, $v_M$ and $v_L$ are initialized to zero at the start of each block of 2*L symbols (L bit intervals), and the Viterbi decoding process and summing of the terms in Eqn. (8) to Eqn. (10) proceeds, for each state, over the selected path.

Figure 5:
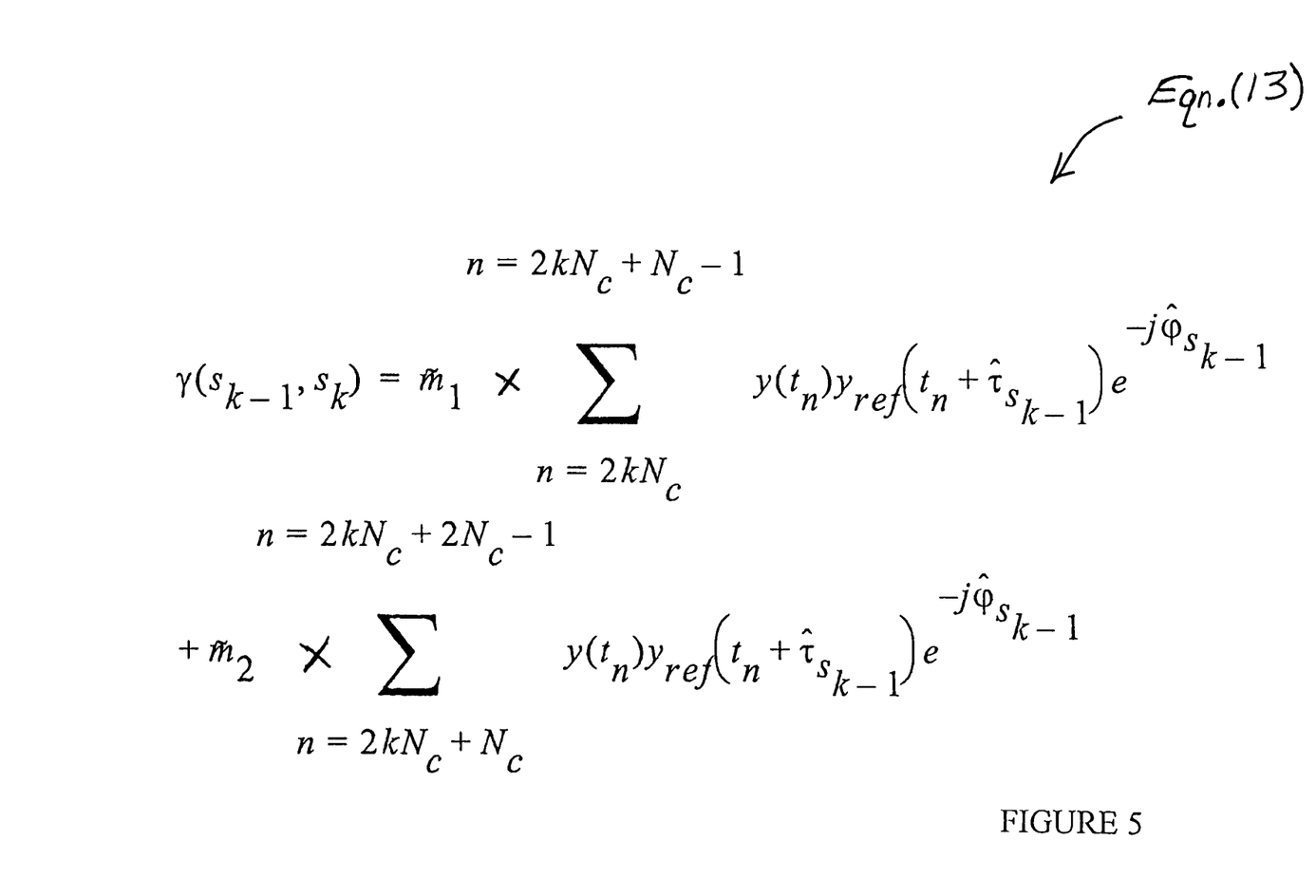
FIG. 5 illustrates operations which can be performed by exemplary embodiments of a transition metric determiner according to the invention.

For example, at the next bit interval, k, for each state, $s_k$, exemplary embodiments of the invention perform the following steps S1-S3:

S1) Using the current time delay estimate, $\hat{\tau}_{s_{k-1}}$, and phase estimate, $\hat{\phi}_{s_{k-1}}$, Eqn. (13) of FIG. 5 is used to despread the sampled data symbol sequence and calculate transition metrics, $\gamma$ $(s_{k-1}, s_k)$. In Eqn. (13) $\tilde{m}_1$ and $\tilde{m}_2$ are the codeword symbols associated with the branch transition from $S_{k-1}$ to $S_k$. Two transition metrics, corresponding to the two possible incoming path segments or branch transitions (see also FIG. 4), are calculated for each state at each bit interval k. The time delay and phase estimates (with subscripts k−1 in FIG. 5) used in a given transition metric calculation are those estimates currently associated with the state from which the transition (path segment) under consideration originates. For example, considering state 01 in FIG. 4, one transition metric would be calculated using the current time delay and phase estimates for state 00, and the other transition metric would be calculated using the current time delay and phase estimates for state 10. For the rate ½ (punctured) code, the parity symbol is not sent on even numbered bits, as shown in FIG. 1, so the second sum in Eqn. (13) is zero for every other bit period. For the rate ⅓ Turbo code, the parity bits are always sent so both sums are computed.

Figure 6:
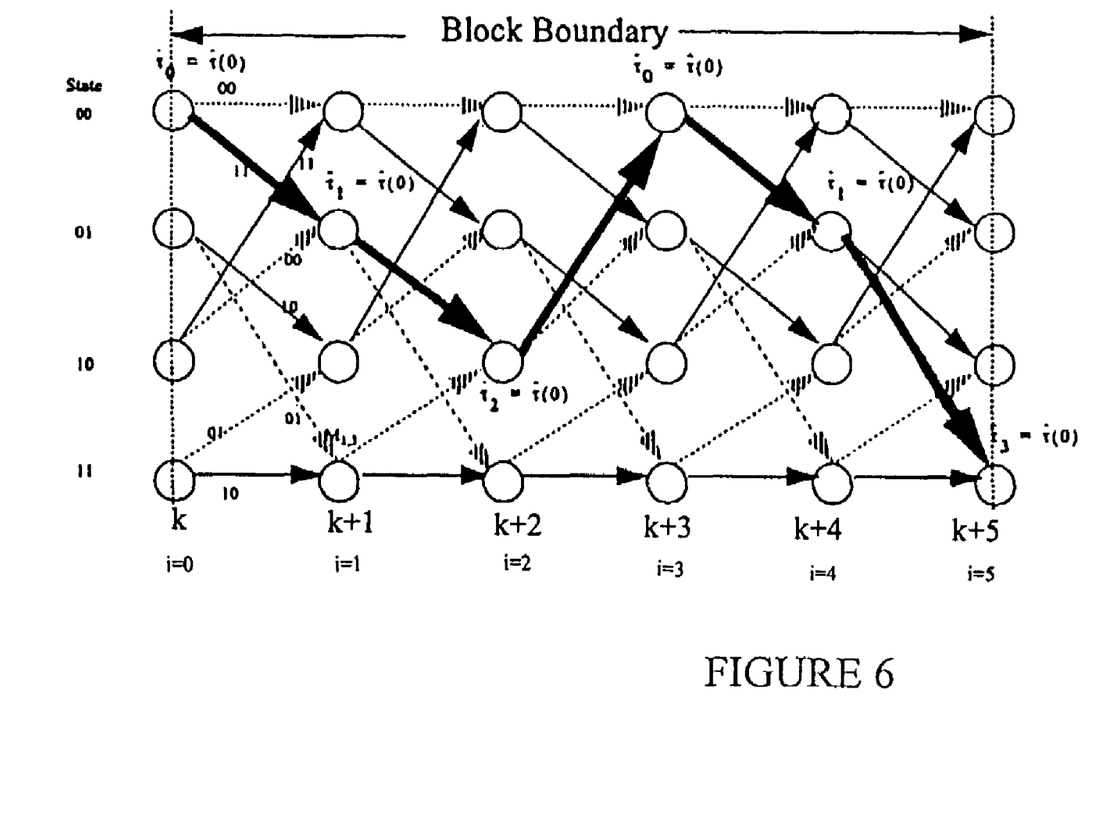
FIG. 6 is a trellis diagram which illustrates the propagation of time delay and phase estimates according to exemplary embodiments of the invention.

S2) Using the transition metrics, the Viterbi path metric is updated and the codeword symbols $\hat{m}_1(k, s_k)$ and $\hat{m}_2(k, s_k)$ are selected. Some embodiments use the transition metrics, as calculated in FIG. 5, to update the Viterbi path metric in the following manner. For a given state at a given time interval, Eqn. (13) is used to compute two transition metrics (complex numbers), which are respectively associated with the two possible incoming path segments illustrated in FIG. 4. The real component of each of these complex transition metrics is then added to its corresponding path metric to determine a resulting updated path metric associated with that particular transition. Then, the selected transition is determined to be the transition whose transition metric results in a larger updated path metric. The time delay estimate, $\hat{\tau}_{s_{k-1}}$, and the phase estimate, $\hat{\phi}_{s_{k-1}}$, associated with the selected transition are propagated to the next bit iteration. FIG. 6 shows an example of time delay propagation, which is described in more detail below.

S3) Using the selected codeword symbols and the propagated phase and time delay estimates, the early, late, and middle correlation operations are performed as defined in Eqn. (8) to Eqn. (10) of FIGS. 7-9. Propagation of time delay and phase estimates will be described with reference to the example of FIG. 6. In FIG. 6, solid lines indicate selected state transitions and the heavy solid lines indicate the selected path through the block. Considering the heavy solid line path example shown in FIG. 6, because the transition from state 00 to state 01 was chosen at time k+1, the time delay estimate for state 00, $\hat{\tau}(0)$, is propagated to state 01 and used as $\hat{\tau}$ in the correlator calculations for state 01 at time k+1. Then, because the 01-to-10 transition was chosen at time k+2, $\hat{\tau}(0)$ propagates on for use as $\hat{\tau}$ in the correlator calculations for state 10 at time k+2. The phase estimates $\hat{\phi}$ are also propagated in this fashion.

S4) Steps S1-S3 above continue to repeat until the end of the block occurs at interval k+L. At this point in time, the integrators in Eqn. (8) to Eqn. (10) are dumped and the results are fed to a delay computer and a phase detector which are followed by loop filters to produce updated phase and time estimates for use with the next block of 2*L symbols.

It should be noted that the above-described propagated time delay and phase estimates are also used in step S1 above for the calculation of transition metrics using Eqn. (13).

Figure 11:
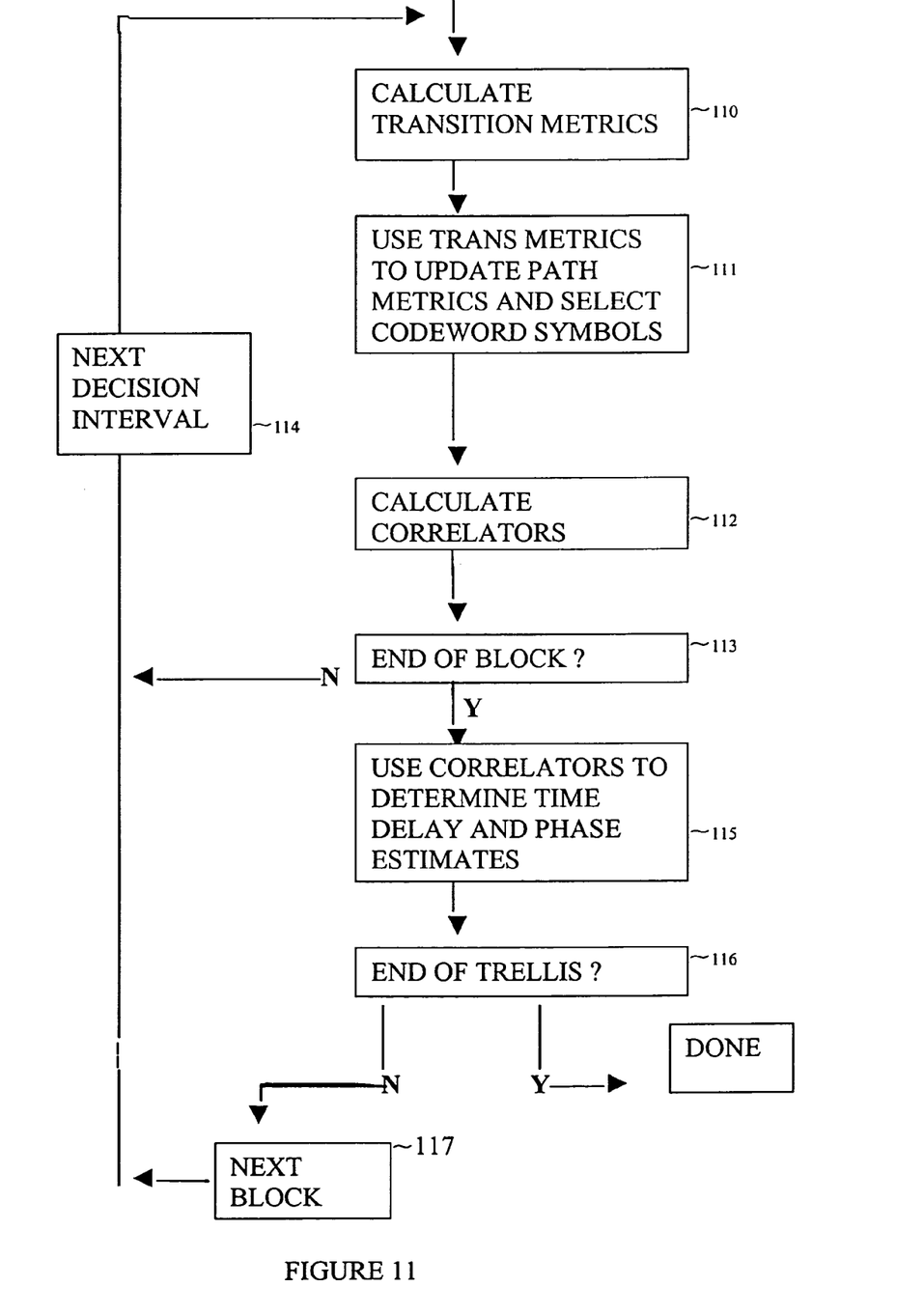
FIG. 11 illustrates exemplary operations according to the invention.

FIG. 11 illustrates some of the exemplary operations described above. At 110, the transition metrics are calculated, and these transition metrics are used at 111 to update the Viterbi path metrics and select the codeword symbols. At 112, the updated path metrics and selected codeword symbols are used to calculate the early, middle and late correlators. As illustrated at 113 and 114, the operations at 110-112 are repeated at each successive decision interval in the trellis, until the end of the current block is identified at 113. Thereafter at 115, the correlators calculated at 112 are used to determine updated time delay and phase estimates for use with the next block. As shown at 116 and 117, the operations at 110-115 are repeated for each successive block of trellis decision intervals until the end of the trellis is reached at 116.

Figure 12:
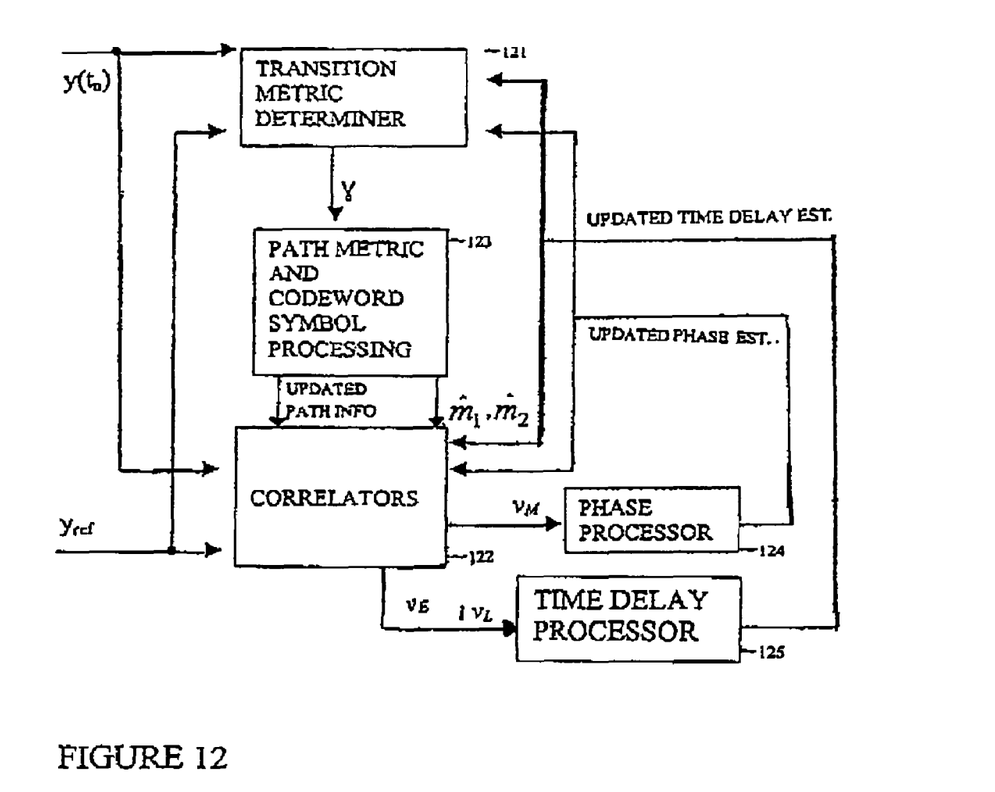
FIG. 12 diagrammatically illustrates pertinent portions of exemplary embodiments of a digital communications receiver according to the invention.

FIG. 12 diagrammatically illustrates exemplary embodiments of a digital communications receiver according to the invention. In the example of FIG. 12, the received signal $y(t_n)$ and the reference spreading function $y_{ref}$ are input to a transition metric determiner 121 and also to the early, middle and late correlators 122. The transition metric determiner 121 uses, for example, Eqn. (13) to produce the transition metrics for input to a path metric and codeword symbol processing unit 123. The unit 123 uses the transition metrics received from transition metric determiner 121 to update the Viterbi path metrics and select the codeword symbols. The unit 123 provides the updated path information and the selected codeword symbols to the correlators 122, which in turn calculate the early, middle and late correlators using, for example, Eqns. (8)-(10).

The middle correlator is provided to a phase processor 124, and the early and late correlators are provided to a time delay processor 125. The phase processor 124 produces the updated phase shift estimate in response to the middle correlator, for example, by plugging the middle correlator into Eqn. (11) of FIG. 10, and processing the result in a loop filter. The updated phase estimate is fed back to the correlators 122 and the transition metric determiner 121 for use in Eqns. (8)-(10) and (13). Respective updated phase estimates are provided for each of the respective states of the Viterbi trellis.

The time delay processor 125 produces an updated time delay estimate in response to the early and late correlators. In one exemplary embodiment, the time delay processor 125 compares the real component of the early correlator to the real component of the late correlator. If the real component of the early correlator is greater than the real component of the late correlator, then the current time delay estimate is increased by one reference sample to produce the updated time delay estimate. Otherwise, the current time delay estimate is decreased by one reference sample to produce the updated time delay estimate. The time delay processor 125 produces respective updated time delay estimates for each of the respective states of the Viterbi trellis, and these updated time delay estimates are fed back to the correlators 122 and the transition metric determiner 121 for use in Eqns. (8)-(10) and (13).

The correlators 122 and the transition metric determiner 121 utilize the updated time delay and phase estimates in Eqns. (8)-(10) and (13) during the processing of the next block of Viterbi trellis decisions.

It can be seen from the foregoing that the transition metric determiner 121 and the path metric and codeword symbol processing unit 123 function as a decoder for performing Viterbi decoding operations according to the invention, including, in some embodiments, integrating the despreading operation into the decoding operation. The early and late correlators, together with the time delay processor 125, function as a time delay estimator, and the middle correlator and phase processor 124 function as a phase estimator.

At the end of the trellis, as with the conventional Viterbi Algorithm, each surviving path has an associated path metric, and the ML (maximum likelihood) path is the one of the surviving paths with the largest path metric. Also, in Turbo decoding embodiments such as in FIG. 13, a soft output in the form of the a posteriori LLR, L(u(k)|y), is needed for each decoded bit. To calculate L(u(k)|y), the normal trace-back operation for the conventional Soft-Output Viterbi Algorithm (SOVA) can be used.

Continuing with the Turbo decoder of FIG. 13, the output from the IVA decoder is fed to the input of the SOVA decoder 132. The input signal, therefore, needs to be despread prior to being used by the SOVA decoder 132. The IVA decoder provides the set of despread symbols that feed the decoder 132. Note in FIG. 13 that the systematic symbols are interleaved before presentation to the SOVA decoder 132, in order to agree with the bit order that was encoded at the transmitter (see also FIG. 1). The output of the decoder 132 includes the extrinsic information, $L_e(u(k))$, the a posteriori LLR L (u(k)|y), and symbols estimates, P* associated with the second component code (see code 2 of FIG. 1).

The parity symbols, P*, shown in FIG. 13, are created in the SOVA decoder 132 and are used in the DPLL section of the IVA decoder. These parity symbols are used to increase the effective SNR at the DPLL correlators outputs. To illustrate their use, consider Eqn. (8), Eqn. (9), and Eqn. (10) above for a rate ½ punctured Turbo code. In each equation, the first term is a summation of systematic bits and the second term is a summation over the parity bits. For a rate ½ Turbo code the parity bits are alternately from encoder 1 and the encoder 2 (see also FIG. 1). The symbol estimates for the parity bits must be taken alternately from the two decoders of FIG. 13. The parity symbol estimates, P* are used by the IVA decoder as $\hat{m}_2(k, s_k)$ in Eqns. (8), (9) and (10). This accounts for the parity symbol modulation at the transmitter (FIG. 1) and allows for integration over all of $y(t_n)$ in Eqn. (8), Eqn. (9), and Eqn. (10). This further improves the effective SNR of the correlator outputs. In the transition metric computation of Eqn. (13) for the rate ½ (punctured) code, however, the input signal $y(t_n)$ corresponding to parity symbols produced by the Code 2 component encoder (see FIG. 1) is still set to zero for every other bit.

The extrinsic information from the decoder 132 is deinterleaved and fed to the IVA decoder. Only the decoder 132 works with interleaved data. As with the standard Turbo algorithm, the UVA decoder now decodes the same input using the extrinsic information from the decoder 132 to improve the decoding process. The process is repeated until the Turbo decoder operation is complete.

Although exemplary embodiments of the invention have been described above in detail, this does not limit the scope of the invention, which can be practiced in a variety of embodiments.

What is claimed is:

1. A method of operating a communication signal processing apparatus, comprising:
    receiving a communication signal that corresponds to a transmitted communication signal which carries systematic data and parity data produced from the systematic data by a convolutional encoding operation at a transmitter;
    performing a convolutional decoding operation to obtain from the received communication signal an estimate of the systematic data; and
    estimating a time delay associated with the received communication signal based on said convolutional decoding operation.

2. The method of claim 1, further comprising estimating a phase of the received communication signal based on said convolutional decoding operation.

3. The method of claim 2, wherein said transmitted communication signal has been spread according to a spreading operation at the transmitter, and comprising integrating into said convolutional decoding operation a despreading operation which despreads the received communication signal based on said spreading operation.

4. The method of claim 1, wherein said transmitted communication signal has been spread according to a spreading operation at the transmitter, and comprising integrating into said convolutional decoding operation a despreading operation which despreads the received communication signal based on said spreading operation.

5. The method of claim 1, wherein said estimating step includes updating an estimate of said time delay based on a temporal sequence of trellis decisions in said convolutional decoding operation.

6. A method of operating a communication signal processing apparatus, comprising:
    receiving a communication signal that corresponds to a transmitted communication signal which carries systematic data and parity data produced from the systematic data by a convolutional encoding operation at a transmitter;
    performing a convolutional decoding operation to obtain from the received communication signal an estimate of the systematic data; and
    tracking a phase of the received communication signal using information that said convolutional decoding operation also uses in obtaining the systematic data.

7. The method of claim 6, wherein said transmitted communication signal has been spread according to a spreading operation, and comprising integrating into said convolutional decoding operation a despreading operation which despreads the received communication signal based on said spreading operation.

8. The method of claim 6, wherein said tracking step includes updating an estimate of said phase based on a temporal sequence of trellis decisions in said convolutional decoding operation.

9. A method of operating a communication signal processing apparatus, comprising:
    receiving a communication signal that corresponds to a transmitted communication signal which carries systematic data and parity data produced from the systematic data by a convolutional encoding operation at a transmitter, the transmitted communication signal having also been spread according to a spreading operation at the transmitter;
    performing a convolutional decoding operation to obtain from the received communication signal an estimate of the systematic data; and
    integrating into said convolutional decoding operation a despreading operation which despreads the received communication signal based on said spreading operation.

10. The method of claim 9, wherein said spreading operation uses a direct sequence spread spectrum (DSSS) code.

11. An apparatus for communication signal processing, comprising:
    an input for receiving a communication signal that corresponds to a transmitted communication signal which carries systematic data and parity data produced from the systematic data by a convolutional encoding operation at a transmitter;
    a decoder coupled to said input for performing a convolutional decoding operation to obtain from the received communication signal an estimate of the systematic data; and an estimator coupled to said decoder and said input for estimating a time delay associated with the received communication signal based on said convolutional decoding operation.

12. The apparatus of claim 11, further comprising an estimator coupled to said decoder and said input for estimating a phase of the received communication signal based on said convolutional decoding operation.

13. The apparatus of claim 12, wherein said transmitted communication signal has been spread according to a spreading operation at the transmitter, said decoder further for integrating into said convolutional decoding operation a despreading operation which despreads the received communication signal based on said spreading operation.

14. The apparatus of claim 12, wherein said transmitted communication signal carries further parity data produced from the systematic data by a further convolutional encoding operation at the transmitter, and comprising a further decoder coupled to said decoder, said further decoder for performing a further convolutional decoding operation based on a result of said convolutional decoding operation, said decoder for performing said convolutional decoding operation again based on a result of said further convolutional decoding operation, said time delay estimator coupled to said further decoder for estimating said time delay based on an estimate of said further parity data produced by said further convolutional decoding operation, and said phase estimator coupled to said further decoder for estimating said phase based on said estimate of said further parity data.

15. The apparatus of claim 11, wherein said transmitted communication signal has been spread according to a spreading operation at the transmitter, said decoder further for integrating into said convolutional decoding operation a despreading operation which despreads the received communication signal based on said spreading operation.

16. The apparatus of claim 11, wherein said estimator is for updating an estimate of said time delay based on a temporal sequence of trellis decisions in said convolutional decoding operation.

17. The apparatus of claim 11, wherein said transmitted communication signal carries further parity data produced from the systematic data by a further convolutional encoding operation at the transmitter, and including a further decoder coupled to said decoder, said further decoder responsive to said decoder for performing a further convolutional decoding operation based on a result of said convolutional decoding operation, said decoder responsive to said further decoder for performing said convolutional decoding operation again based on a result of said further convolutional decoding operation, and said estimator coupled to said further decoder for estimating said time delay based on an estimate of said further parity data produced by said further convolutional decoding operation.

18. An apparatus for communication signal processing, comprising:
an input for receiving a communication signal that corresponds to a transmitted communication signal which carries systematic data and parity data produced from the systematic data by a convolutional encoding operation at a transmitter;
a decoder coupled to said input for performing a convolutional decoding operation to obtain from the received communication signal an estimate of the systematic data; and
a phase tracking portion coupled to said decoder for tracking a phase of the received communication signal using information that said convolutional decoding operation also uses in obtaining the systematic data.

19. The apparatus of claim 18, wherein said transmitted communication signal has been spread according to a spreading operation at the transmitter, said decoder further for integrating into said convolutional decoding operation a despreading operation which despreads the received communication signal based on said spreading operation.

20. The apparatus of claim 18, wherein said phase tracking portion is for updating an estimate of said phase based on a temporal sequence of trellis decisions in said convolutional decoding operation.

21. The apparatus of claim 18, wherein said transmitted communication signal carries further parity data produced from the systematic data by a further convolutional encoding operation at the transmitter, and comprising a further decoder coupled to said decoder, said further decoder responsive to said decoder for performing a further convolutional decoding operation based on a result of said convolutional decoding operation, said decoder responsive to said further decoder for performing said convolutional decoding operation again based on a result of said further convolutional decoding operation, and said estimator coupled to said further decoder for estimating said phase based on an estimate of said further parity data produced by said further convolutional decoding operation.

22. An apparatus for communication signal processing, comprising:
an input for receiving a communication signal that corresponds to a transmitted communication signal which carries systematic data and parity data produced from the systematic data by a convolutional encoding operation at a transmitter, the transmitted communication signal having also been spread according to a spreading operation at the transmitter;
a decoder coupled to said input for performing a convolutional decoding operation to obtain from the received communication signal an estimate of the systematic data; and
said decoder further for integrating into said convolutional decoding operation a despreading operation which despreads the received communication signal based on said spreading operation.

23. The apparatus of claim 22, wherein said spreading operation uses a direct sequence spread spectrum (DSSS) code.

24. The apparatus of claim 22, wherein said convolutional decoding operation is a Viterbi decoding operation.

* * * * *